US009974006B2

(12) United States Patent
Kneckt et al.

(10) Patent No.: US 9,974,006 B2
(45) Date of Patent: May 15, 2018

(54) LINK SETUP LEVEL COORDINATION

(71) Applicant: NOKIA CORPORATION, Espoo (FI)

(72) Inventors: Jarkko Kneckt, Espoo (FI); Mika Rinne, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 108 days.

(21) Appl. No.: 14/448,658

(22) Filed: Jul. 31, 2014

(65) Prior Publication Data

US 2015/0036594 A1 Feb. 5, 2015

Related U.S. Application Data

(60) Provisional application No. 61/861,012, filed on Aug. 1, 2013.

(51) Int. Cl.

*H04W 4/00* (2018.01)
*H04W 48/14* (2009.01)
*H04W 8/24* (2009.01)
*H04W 76/02* (2009.01)
*H04W 48/18* (2009.01)
*H04W 36/22* (2009.01)
*H04W 48/16* (2009.01)
*H04W 88/06* (2009.01)

(52) U.S. Cl.

CPC ............. *H04W 48/14* (2013.01); *H04W 8/24* (2013.01); *H04W 48/18* (2013.01); *H04W 76/02* (2013.01); *H04W 36/22* (2013.01); *H04W 48/16* (2013.01); *H04W 88/06* (2013.01)

(58) Field of Classification Search

CPC .................................................... H04W 48/16
See application file for complete search history.

(56) References Cited

U.S. PATENT DOCUMENTS 8,369,854 B2 2/2013 Peisa et al.
9,100,852 B2 * 8/2015 Xiang ............... H04W 28/0231
2007/0115883 A1 5/2007 Narayanan et al.
(Continued)

FOREIGN PATENT DOCUMENTS

WO 2010037422 A1 4/2010

OTHER PUBLICATIONS

Alcate-Lucent; "Policy Based Terminal Triggered, ANDSF Decided Access Selection," 3GPP Draft; S2-081658 Revision of 1355_ANDSF Discussion V2, 3rd Generation Partnership Project (3GPP), Mobile Competence Centre; vol. SA WG2, No. Athens; Feb. 16, 2008, Feb. 16, 2008, XP014156n XP2050263998.

Universal Mobile Telecommunications System (UMTS); LTE Architecture Enhancements for non-3GPP Accesses (3GPP TS 23.402 version 11.5.1 Release 11), Technical Specification, European Telecommunications Standards Institute (ETSI), vol. 3GPP SA 2, No. V11.5.1, Feb. 1, 2013, XP014156393.

International Search Report international application No. PCT/US2014/049421 dated Oct. 22, 2014.

(Continued)

*Primary Examiner* — Kevin C Harper
(74) *Attorney, Agent, or Firm* — Squire Patton Boggs (US) LLP

(57) ABSTRACT

Various communication systems may benefit from coordination in interworking. For example, certain wireless communication systems may benefit from link setup level coordination, such as coordination between a first radio access technology base station and a terminal that is setting up a link to a second radio access technology. A method may include, for example, determining an allowed link setup level for a terminal. The method may also include communicating the allowed link setup level to the terminal.

20 Claims, 7 Drawing Sheets

(56) References Cited

U.S. PATENT DOCUMENTS

| | | | | |
|---|---|---|---|---|
| 2010/0003980 | A1* | 1/2010 | Rune | H04W 48/16 455/436 |
| 2014/0071925 | A1* | 3/2014 | Liu | H04W 28/08 370/329 |
| 2015/0304936 | A1* | 10/2015 | Jung | H04W 40/02 370/329 |

OTHER PUBLICATIONS

3GPP TS 24.312, 3rd Generation Partnership Project; Technical Specification Group Core Network and Terminals; Access Network Discovery and Selection Function (ANDSF) Management Object (MO) (Release 12), V12.5.0 (Jun. 2014), 296 pages.

3GPP Ts 24.302, 3rd Generation Partnership Project; Technical Specification Group Core Network and Terminals; Access to the 3GPP Evolved Packet Core (EPC) via non-3GPP access networks; Stage 3 (Release 12), V12.5.0 (Jun. 2014), 91 pages.

3GPP TS 23.402, 3rd Generation Partnership Project; Technical Specification Group Services and System Aspects; Architecture enhancements for non-3GPP accesses (Release 12), V12.5.0 (Jun. 2014), 291 pages.

IEEE Std 802.11-2012, "Part 11: Wireless LAN Medium Access Control (MAC) and Physical Layer (PHY) Specifications", IEEE Standard for Information technology, Telecommunications and information exchange between systems, Local and metropolitan area networks, Specific requirements, Revision of IEEE Std 802.11-2007, 2792 pages.

Kneckt et al., IEEE 802.11ai D0.6, "Improving WLAN System Performance", IEEE 11-13/1325r5, Nov. 6, 2013, 26 pages.

* cited by examiner

Prior Art

LINK SETUP LEVEL COORDINATION

CROSS-REFERENCE TO RELATED APPLICATION

This application is related to and claims the benefit and priority of U.S. Provisional Patent Application No. 61/861,012, filed Aug. 1, 2013, the entirety of which is hereby incorporated herein by reference.

BACKGROUND

Field

Various communication systems may benefit from coordination in interworking. For example, certain wireless communication systems may benefit from link setup level coordination, such as coordination between a first radio access technology base station and a terminal that is setting up a link to a second radio access technology.

Description of the Related Art

Data offloading may provide an enhancement by increasing the throughput of radio systems. In data offloading, a terminal may have database containing the network operating and security parameters. Networks can be listed in a prioritized order from the most preferred to the least preferred. In particular, the cellular network operators may want to offload traffic from their cellular networks to their own or their roaming partners' Wi-Fi hotspots, and vice versa from the Wi-Fi hotspots to the cellular network.

A device can use the network identifiers and security parameters to take a local access point (AP) of a wireless access network (WLAN) into use. The information of the database may be infrequently updated. Thus, availability of the network, network congestion and device link failures may affect the service offered to the user of the device.

Link creation to the WLAN network may have many steps and phases. Typically a WLAN network may be discovered first. In network discovery, the WLAN device can receive a frame transmitted to or from the AP. Typically the network discovery is done when the beacon, measurement pilot, fast initial link setup discovery (FILS), or probe response frame from the AP is received. Typically, during the discovery process, the link performance to the AP is assessed and the congestion level of the AP and the capabilities of the AP are detected. In discovery operation, the terminal conventionally authenticates the AP or ensures that AP operates correctly.

After discovery, the terminal conventionally creates 0-authentication. In 0-authentication, the terminal may implement a simple authentication mechanism. After 0-authentication the terminal can associate with the AP.

In the associated state, the AP conventionally performs 802.1X protocol and provides Robust Security Network Authentication (RSNA) with the 4-way handshake and the group key handshake, and then opens an 802.1x port to the internet. The RSNA operation typically consists of transmission of 10-30 authentication frames. Depending on the network congestion, authentication server implementation and its parameters, and depending on the authentication server congestion, the duration of the RSNA signaling may vary.

After RSNA authentication, the terminal executes the Dynamic Host Configuration Protocol (DHCP) Request or by other means gets IP addresses for its operation in the internet. By having a valid IP address and authentication keys the terminal ensures that it may transmit traffic or may start to transmit traffic to the internet, or it may receive traffic from the Internet.

Hotspot 2.0 protocol has defined a mechanism in which the terminal may perform low weight authentication during the discovery phase. The target of this operation is to ensure that discovery information is received from the correct AP.

Similarly, fast initial link setup (802.11ai) relates to the reduction of the link setup time. In particularly, 802.11ai attempts to reduce the time required for network discovery and authentication. In general, the WLAN link setup phases are defined in IEEE 802.11-2012 or in IEEE 802.11ai, for example in IEEE 802.11ai D0.6, each of which is hereby incorporated herein by reference in its entirety.

SUMMARY

According to a first embodiment, a method may include determining at least one of a minimum link setup level or a maximum link setup level for a terminal. The method may also include communicating the at least one of the minimum link setup level and the maximum link setup level to the terminal.

In a variant, the minimum link setup level can define the operations that the terminal needs to execute successfully before the terminal is allowed to report a network or radio access technology as available to a base station that communicated the at least one of the minimum link setup level and the maximum link setup level to the terminal.

In a variant, the maximum link setup level can define the operations that the terminal is allowed to execute before reporting a network or radio access technology as available to a base station that communicated the at least one of the minimum link setup level and the maximum link setup level to the terminal.

In a variant, the method can include setting an expected link setup level that the terminal is expected to reach in order to report the availability of a second radio access for further proceeding of the offload process by the eNB.

In a further variant, the method can include the eNB setting the expected link setup level to different values at least according to one of different candidate access technologies, different candidate access networks, for different terminals, for different served traffic types of the terminal, or for different originated traffic types of the terminal.

In a variant, the base station can further allow more operations by transmitting a signal to the terminal.

In a variant, an evolved Node B can coordinate the operations of a wireless local area network terminal in connection with the communicated at least one of the minimum link setup level and the maximum link setup level.

In a variant, an ANDSF MO provides radio interworking steps to a wireless local area network terminal in connection with the communicated minimum link setup level and maximum link setup level.

In a variant, an eNB provides radio interworking steps to a wireless local area network terminal in connection with the communicated at least one of the minimum link setup level and the maximum link setup level.

In a variant, the method can further include receiving from the terminal a link setup level that the terminal has established with an access point on the terminal's own initiative.

In a variant, the method can further include selecting a network to which the terminal will create a link and communicating this information to the terminal.

In a variant, the method can additionally include receiving a report from the terminal regarding availability of the network when the terminal has established the link setup operations as specified for the link setup level.

In a variant the ANDSF can define the minimum link level setup.

In a variant, when the minimum link setup level is set to the highest data transmission level, the eNB commands the terminal to use the network without additional signaling of permission.

Each of the above variations may be combined with one another.

According to a second embodiment, a method can include receiving at least one of a minimum link setup level or a maximum link setup level at a terminal. The method can also include performing, by the terminal, link setup within a range defined by the at least one of the minimum link setup level and the maximum link setup level.

In a variant, the minimum link setup level can define the operations that the terminal needs to execute successfully before the terminal is allowed to report a network or radio access technology as available to a base station that communicated the at least one of the minimum link setup level and the maximum link setup level to the terminal.

In a variant, the maximum link setup level can define all the operations that the terminal is allowed to execute before reporting a network or radio access technology as available to a base station that communicated the at least one of the minimum link setup level and the maximum link setup level to the terminal.

In a variant, the method can further include receiving a further signal from the base station configured to allow more operations of the terminal and performing the operations upon receiving the further signal.

In a variant, the method can additionally include sending, to a base station, a link setup level that the terminal has established with an access point on the terminal's own initiative.

In a variant, the method can also include reporting regarding availability of the network when the terminal has established the link setup operations as specified for minimum link setup level.

Each of the above variations may be combined with one another.

According to respective third and fourth embodiments, an apparatus can include at least one processor and at least one memory including computer program code. The at least one memory and the computer program code can be configured to, with the at least one processor, cause the apparatus at least to perform the methods of the first or second embodiments in any of their variants.

According to respective fifth and sixth embodiments, a non-transitory computer-readable medium can be encoded with instructions that, when executed in hardware, perform the methods according to the first or second embodiments in any of their variants.

According to respective seventh and eighth embodiments, a computer program product can include computer program instructions for performing the methods according to the first or second embodiments in any of their variants.

According to a ninth and tenth embodiments, an apparatus can includes means for performing each of the functions of a respective method according to either the first or second embodiments, in any of their variants.

According to an eleventh embodiment, a system can include an apparatus according to the ninth embodiment, in any of its variants, and an apparatus according to the tenth embodiment, in any of its variants.

BRIEF DESCRIPTION OF THE DRAWINGS

For proper understanding of the invention, reference should be made to the accompanying drawings, wherein.

DETAILED DESCRIPTION

Figure 1:
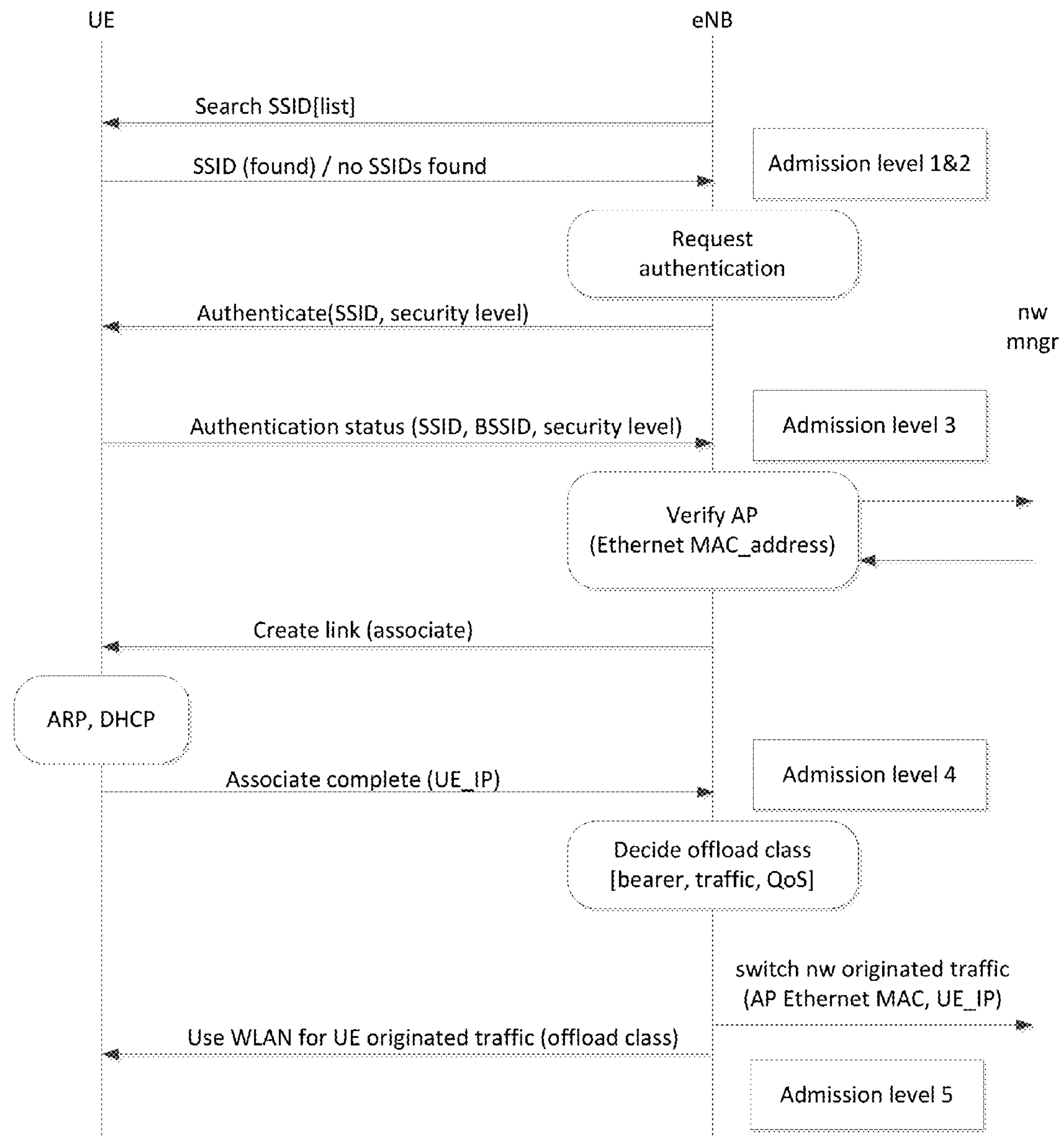
FIG. 1 illustrates example operations to establish a WLAN link for data offloading, according to certain embodiments.

The access network discovery and selection function (ANDSF) typically lists the parameters of the networks that are available for offloading. The ANDSF typically lists the network parameters, the location of the access points and defines the preferred order for the network selection. ANDSF may not contain definitions for all the networks possibly found in an area. All devices may not have a valid ANDSF object description for offloading.

3GPP TS 24.312 Access Network Discovery and Selection Function (ANDSF) Management Object (MO), 3GPP TS 24.302 Access to the 3GPP Evolved Packet Core (EPC) via non-3GPP access networks; Stage 3, and 3GPP TS 23.402 Architecture enhancements for non-3GPP accesses, describe various access techniques, devices, and systems and are hereby incorporated herein by reference in their entirety. Similar to ANDSF MO, other management objects or policy descriptions may be made available for the terminal, such as those objects defined by the Open Mobile Alliance (OMA).

As the wireless link setup may include exchange of multiple frames, multiple procedural phases and multiple procedures before the link is available for offloading, it may be necessary and beneficial for the network to understand the level to which the terminal has prepared the link to a candidate access point. For instance, some terminals may just detect that AP signal is present, while other terminals may authenticate or even further get IP addresses via the AP. The level of link setup by a terminal may also depend on the network the AP belongs to. Some networks are easier to access than others, and the trust level of the network may appear different. The preferred link setup may also depend on the ANDSF MO definitions and/or interworking policies between the networks. These may be set by the cellular operator, may be set by the user of the terminal, or may be configured to the terminal or its subscription module or its passpoint software.

Hence, the terminal may just report found APs or the terminal may prepare the AP usage as far as possible in order to reduce the delays of offloading at a time of offloading decision. Depending on the license terms of the network, the link setup may already create costs to the user. The terminal and/or the networks may benefit, if the network defines the operations that are allowed for the terminal to perform independently of its own initiative and the network defines which operations require explicit allowance by the network to proceed. In order for the network to have a role in controlling the offloading, radio level interworking may be needed instead of or in addition to possible core network assistance. The network in this discussion refers to any network element or network function that defines the level of interworking or integration between the different networks. In particular, the network can be the radio access network, which defines and controls the radio level interworking, instead of or in addition to the possible core network assistance, policies or managing server objects. The radio level interworking or radio level integration may have benefits of being fast, being up to date with radio quality and radio performance metrics reachable by the access selection and not loading the core network decision making elements with dynamic and local behavior, which are manageable by the radio access network itself. The radio access network may execute the required functionality in the evolved NodeB (eNB) of a 4G Long Term Evolution (LTE) network, or in a base station of another network generation technology like 3G NodeB, or High Speed Packet Access (HSPA) NodeB or a GERAN base station. Some of these radio access network functions may execute in a base station, in a radio network controller (RNC) or in a combination thereof. In particular, in a LTE/LTE-Advanced network interworking with a wireless LAN network, the controlling functions may reside in the eNB. Other related functionality may yet be required in the terminal and/or in the AP of the wireless network.

Accordingly, in certain embodiments an ANDSF management object (MO) may contain rules and policies to specify the minimum link setup level and the maximum link setup level, which are allowed for the terminal to execute from its own initiative.

The minimum link setup level defines the operations that the terminal needs to successfully execute before the terminal is allowed to report to the eNB that the network or the radio access technology (RAT) is available.

The maximum link setup level defines all the operations that the terminal is allowed to execute before reporting to the eNB the availability, so that the eNB may then control to further allow more operations or to deny further operations by transmitting a signal to the terminal. The signal may be made up of physical waveforms, acknowledgement indications or protocol messages or information elements for the said allowance or denial.

Certain embodiments may enable tight interworking, in which the eNB coordinates the steps of the terminal in respect to its WLAN operations. Alternatively, certain embodiments may provide a way of loose interworking, in which the terminal obtains the definitions of radio interworking steps from the ANDSF MO, the interworking steps of which are then executed in the radio access operation accordingly.

Various implementations of certain embodiments are possible. For example, the terminal may indicate to an eNB a link setup level that the terminal has established with the AP on the terminal's own initiative. The link setup level may be indicated according to the presence of the ANDSF specific minimum or maximum link setup level definitions, or requirements. In an alternative embodiment, the link setup level may be indicated regardless of the presence of ANDSF definitions, by the control of the eNB for the radio access network level control of interworking. The link setup levels are shown in FIG. 1 and explained in Table 1.

TABLE 1

Example Link Setup Levels

| Link setup level | Explanation |
|---|---|
| 0 | Not specified |
| 1 | The terminal has received a frame addressed to or from the AP. |
| 2 | The terminal has received a Beacon or Probe Response from the AP and AP parameters match to the values of the ANDSF MO |
| 3 | The terminal has authenticated with the AP. |
| 4 | The terminal has created a link, i.e. the IP addresses are obtained, the terminal (WLAN station, STA, functionality) has authenticated with the AP. The terminal is not transmitting or receiving traffic through the link |
| 5 | The terminal may transmit and receive traffic through the link |

The numbering of Table 1 follows the numbering used in FIG. 1. Other numbering schemes are also permitted. As shown in Table 1, link setup level 0 may refer to a case where the level is not specified. Link setup level 1 may refer to a case in which the terminal has received a frame addressed to or from the AP. Link setup level 2 may refer to a case in which the terminal has received a beacon or probe response from the AP and AP parameters match to the permitted values, for example given in the ANDSF MO. Link setup level 3 may refer to a case in which the terminal has authenticated with the AP. Link setup level 4 may refer to a case in which the terminal has created a link. For example, the IP addresses may have been obtained and the terminal (STA) may have authenticated with the AP. In this case, however, the terminal is not transmitting or receiving traffic through the link. Link setup level 5 may refer to a case in which the terminal is transmitting or receiving traffic through the link, or is ready to do so.

In general, the ANDSF can select the network to which the terminal will create the link. The terminal may report the availability of the network when it has established the link setup operations as specified for the minimum link setup level. The terminal may be expected to perform all the operations of its own initiative as specified for the minimum link setup level without additional instructions from the eNB. In here, the ANDSF may yet have a role in assisting network detection and prioritizing the network selections. The ANDSF may have the further role of defining the minimum link level setup. If the minimum link setup level is set to the highest data transmission level in order to be available, the eNB can directly command the terminal to use the available network without additional signaling of allowance.

By setting the maximum link setup level, the eNB may specify the level of prepared actions that the terminal is allowed to perform from its own initiative. For instance, the eNB may allow the terminal to authenticate with the network. Thus, the eNB can know that the network is really present and successfully authenticated before the terminal indicates the availability of the network.

For the minimum link setup, some performance tradeoffs may exist. The preparations to take the link into use can consume power and operating time from the terminal. If the level of the minimum link setup level is high, multiple operations may unnecessarily be executed and hence consume the battery of the terminal. On the other hand, the time required to start using the AP for offloading is shortened, as if more operations can be prepared beforehand. In case the minimum link setup level is low, many APs may be unnecessarily detected and reported (despite of whether they are really available or not), and the time to start using an AP for offloading is lengthy and may include trial and error phases before the actual serving AP is finally available for the offloading.

The maximum link setup level defines the operations that the terminal may perform without asking allowance from the eNB to continue the link setup with an AP. A contract for network use, such as a roaming partner contract, may specify different sign-in costs. For instance, the cost of network use may depend on the time that the terminal operates in an authenticated state. To lower the costs of data transmission, the operator may have configured that the terminal is not allowed to authenticate with the network unless the eNB has explicitly allowed the operation. This avoids the terminal unnecessarily hanging in an authenticated state in a network at times when it is not actually in use for offloading. On the other hand, hanging in the authenticated state in a selected, preferred network may be beneficial in situations, where offloading needs appear and disappear frequently, so that the actual offloading may happen fast when acute.

The minimum link setup level may contain the same or fewer link setup operations than the maximum link setup level. If the minimum link setup level and the maximum link setup level allow different operations, the operations between the levels can be optional for the terminal to perform. For instance, the terminal may indicate the presence of the candidate offloading network immediately when the minimum link setup level criterion is met and the terminal may further continue executing the operations up to the maximum link setup level while waiting for the response from the eNB for the allowance. The terminal may have power, delay and efficiency optimizations set for the link level setup decisions, in frames of the given minimum and maximum.

In certain embodiments where the minimum link setup level and the maximum link setup level are set to equal, a single value or indicator can be used. In other embodiments, one of the two levels can be provided together with an indication of a difference between the levels. For example, the maximum level may be identified and the minimum level is identified relative to the maximum level, or vice versa.

The networks may use tight or loose interworking scheme for the terminal. In tight interworking, the eNB can control and coordinate exactly the operations that the device performs with the specific network. This control may even be tied to a strict interworking timing relationship, like a handover procedure as an example. In tight interworking the eNB may allow the terminal to perform one operation at a time, which can also be referred to as a step by step approach. FIG. 1 shows an example of signaling in a tight interworking embodiment. In case of multiple steps, multiple admission levels may have to be passed in a controlled manner. In case of a single step approach, only the one selected admission level has to be passed in a controlled manner.

In loose interworking, the eNB may minimize the signaling messages needed to transmit to the terminal, and the eNB may minimize its burden of controlling the terminal behavior that exactly. If the minimum or the maximum link setup level is set to the actual data transmission, the terminal may not receive any in advance allowance signaling from the eNB, before the actual offloading signaling happens. If the maximum link setup level is set to another value, the eNB may specify the link setup level to which the terminal is allowed to set up the link. Thus, the link setup is allowed with one or more messages transmissions.

As shown in FIG. 1, the terminal can select the signaling message based on the link setup level the terminal has created with the candidate network.

FIG. 1 illustrates example operations to establish a WLAN link for data offloading. As shown in FIG. 1, first an eNB can send a command to search and a list of SSIDs. The list of SSIDs may also be provided to the terminal by other means, and the eNB in such a case may just send a command to start searching, unless the terminal is searching anyway of its own initiative. Then the UE can respond either with the found SSIDs or a report that there were no found SSIDs. These steps can correspond to admission levels 1 and 2.

The eNB can then request authentication. The authentication command can be sent with an SSID and a security level. The UE can then report back with the authentication status, including SSID, BSSID, and security level of the selected access network. These steps can correspond to admission level 3.

The eNB may verify the AP that the terminal selected by the Ethernet MAC address with a further network (NW) manager (mngr) function. If the selected AP is a verified AP of a trusted access network, the eNB can then command the terminal to create a link to associate with the AP. The UE can engage in ARP and DHCP procedures to bootstrap and then report back to the eNB that the association is complete and the UE has a valid IP address. These steps can correspond to admission level 4.

Next, the eNB can decide for the offload, for example the eNB may decide an offload class including bearer, traffic, and quality of service (QoS) related information. The eNB may then instruct or advise the network manager to switch selected traffic to the AP having that Ethernet MAC address mentioned above, and hence reach the UE in its UE IP address via the AP. Moreover, the eNB can instruct the UE to use WLAN for the selected UE originated traffic, and can respectively apply an offload class. Instead of offloading selected traffic or selected bearers, the offload may apply to all traffic, or the offload may apply to all traffic exceeding certain thresholds like bit rate or throughput or delay thresholds, despite of its traffic type. These steps can correspond to admission level 5.

Figure 2:
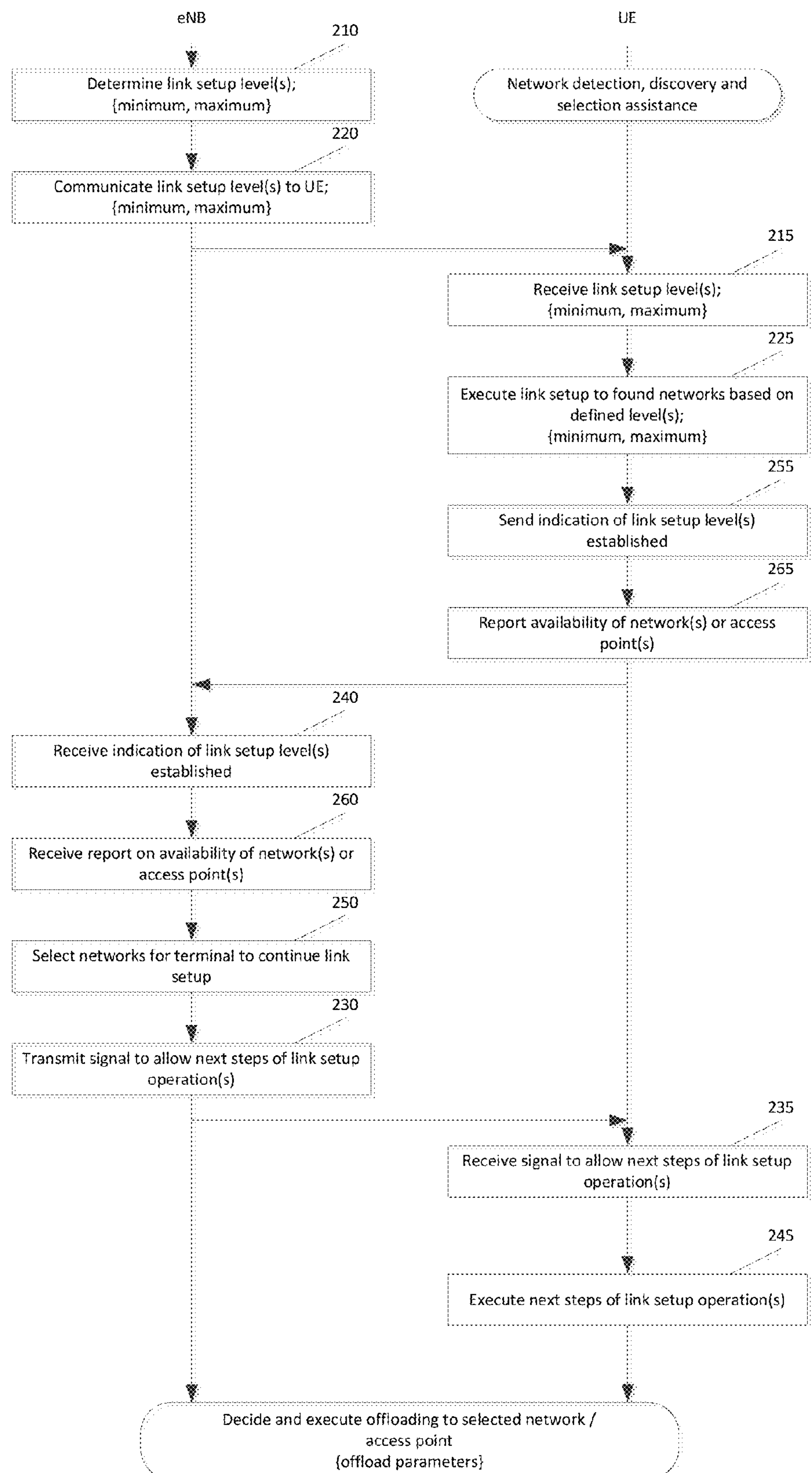
FIG. 2 illustrates a method according to certain embodiments.

FIG. 2 illustrates a method according to certain embodiments. As shown in FIG. 2, a method can include, at 210, determining at least one of a minimum link setup level or a maximum link setup level for a terminal. For example both the minimum link setup level and the maximum link setup level can be determined, or only one of these can be determined. In certain embodiments, the minimum link setup level may equal the maximum link setup level.

The method can also include, at 220, communicating the minimum link setup level and the maximum link setup level, or either of the levels, to the terminal.

The minimum link setup level can define the operations that the terminal needs to execute successfully before the terminal is allowed to report a network or radio access technology as available to a base station that communicated the minimum link setup level and the maximum link setup level to the terminal. The maximum link setup level can define all the operations that the terminal is allowed to execute before reporting a network or radio access technology as available to a base station that communicated the minimum link setup level and the maximum link setup level to the terminal. An ANDSF may define the minimum link level setup, the maximum link level setup, or both. Alternatively, the minimum and maximum link level setup levels may be set by a policy controller in the core network, or they may be set by the radio access network, or the radio access network and the core network together. For example, the operations and control management entity (O&M) of the network could signal such minimum and maximum levels to the radio access network, the radio access network of which could then apply these dynamically with the terminal when beneficial.

The method can further include, at 230, the base station transmitting a signal to the terminal, where the signal is configured to allow more operations by the terminal with respect to the link setup.

In this method, an eNB can coordinate the operations of a wireless local area network terminal in connection with the communicated minimum link setup level and the maximum link setup level. Alternatively, an ANDSF MO can provide radio interworking steps to a wireless local area network terminal in connection with the communicated minimum link setup level and maximum link setup level.

The method can also include, at 240, receiving from the terminal a link setup level that the terminal has established with an access point on the terminal's own initiative.

The method can further include, at 250, selecting a network to which the terminal will create a link. The method can additionally include, at 260, receiving a report from the terminal regarding availability of the network when the terminal has established the link setup operations as specified for minimum link setup level.

When the minimum link setup level is set to the highest data transmission level, the eNB can thereby command the terminal to use the network without additional signaling of permission. Thus, in certain embodiments, the highest level can be set to full subsequent terminal autonomy.

The method can also include, at 215, receiving at least one of a minimum link setup level or a maximum link setup level at a terminal. The method can further include, at 225, performing, by the terminal, link setup within a range defined by the minimum link setup level and the maximum link setup level.

The method can additionally include, at 235, receiving a further signal from the base station configured to allow more operations of the terminal. The method can also include, at 245, performing the operations upon receiving the further signal.

The method can further include, at 255, sending, to a base station, a link setup level that the terminal has established with an access point on the terminal's own initiative.

At 265, the method can include reporting regarding availability of the network when the terminal has established the link setup operations as specified for minimum link setup level.

The functions shown in FIG. 2 are illustrated in a particular order. However, the order of the functions may be changed and the functions shown may be present or absent in various embodiments.

Figure 3:
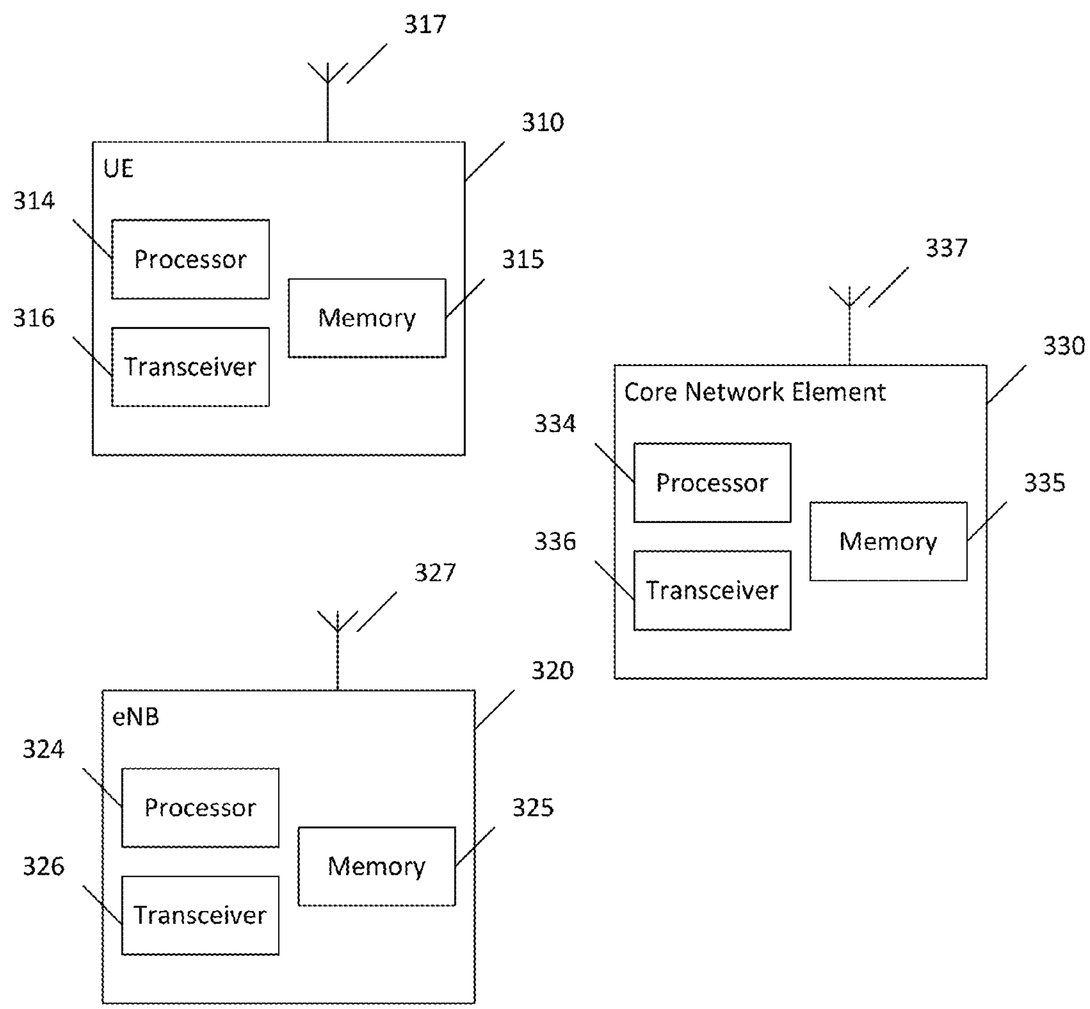
FIG. 3 illustrates a system according to certain embodiments.

FIG. 3 illustrates a system according to certain embodiments of the invention. In one embodiment, a system may include multiple devices, such as, for example, at least one UE 310, at least one eNB 320 or other base station or access point, and at least one core network element 330, such as a network manager. In certain systems, only UE 310 and eNB 320 may be present, and in other systems UE 310, eNB 320, and a plurality of other user equipment may be present. Other configurations are also possible.

Each of these devices may include at least one processor, respectively indicated as 314, 324, and 334. At least one memory can be provided in each device, and indicated as 315, 325, and 335, respectively. The memory may include computer program instructions or computer code contained therein. The processors 314, 324, and 334 and memories 315, 325, and 335 can be configured to provide means corresponding to the various blocks of FIG. 2 or 7.

As shown in FIG. 3, transceivers 316, 326, and 336 can be provided, and each device may also include an antenna, respectively illustrated as 317, 327, and 337. Other configurations of these devices, for example, may be provided. For example, core network element 330 may be configured for wired communication, rather than wireless communication, and in such a case antenna 337 would illustrate any form of communication hardware, without requiring a conventional antenna.

Transceivers 316, 326, and 336 can each, independently, be a transmitter, a receiver, or both a transmitter and a receiver, or a unit or device that is configured both for transmission and reception.

Processors 314, 324, and 334 can be embodied by any computational or data processing device, such as a central processing unit (CPU), application specific integrated circuit (ASIC), or comparable device. The processors can be implemented as a single controller, or a plurality of controllers or processors.

Memories 315, 325, and 335 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 310, eNB 320, and core network element 330, to perform any of the processes described above (see, for example, FIGS. 1, 2, and 7). In some embodiments the eNB and AP may be used interchangeably. In some embodiments an access network element (eNB) may make the decisions for selection of another access network element of the same kind. This could be the case in a heterogeneous network, where a small cell layer may serve as an offload access network despite of the radio access technology that is LTE eNB or a WLAN AP. Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 3 illustrates a system including a UE, eNB, and core network element, embodiments of the invention may be applicable to other configurations, and configurations involving additional elements. The UE 310 may be in communication with a wireless local area network, such as an AP, not shown. This way the described system may involve one or more network layers, one or more radio access technologies or one or more homogeneous or heterogeneous network elements.

Certain embodiments may have various advantages or benefits. For example, the coordination of the admission level may enable the eNB to more precisely coordinate the operation of the terminal Radio level interworking can make this control dynamic and low delay, and can limit the impact locally, for example to eNB coverage area at a time. Overhead of core network involvement can therefore be drastically reduced.

Additionally, in certain embodiments the network operator may coordinate the use of the networks carefully and hence avoid unnecessary costs. The costs could burden the user of the terminal or the operator or both. Furthermore, a rule provided to the terminal may enable the terminal to directly use the network without any command from the eNB.

The radio network may, in certain embodiments, optimize the link set up delays for offloading, battery consumption, for searching and setting up links, and for controlling actions of admission. The amount of controlling may be different for the operator's own hotspot and for a roaming partner hotspot. For a third party network, if permitted, the control can be very tight and may include additional security and AP integrity verification steps.

In certain embodiments, the same or a similar scheme can be applied to WLAN admission from LTE eNB. Likewise, the same or a similar scheme can be applied to WLAN admission from 3G or 2G cellular network.

By setting the link setup level for link setup, in certain embodiments the eNB can define how many operations the terminal may perform, before the candidate AP or the terminal requests eNB allowance to continue the link setup. The determination of the link setup level can enable the eNB to avoid link setup to expensive APs. The AP may allow link setups only to a level that is not charged. The different link setup levels and reporting levels can enable the AP to coordinate how many operations the terminal (STA) may perform. The determination of the link setup levels by the eNB may, as described before, lead the terminal to limit and report the reached availability to the eNB for its control. However, an embodiment may allow that the link setup level limitations set by the eNB are applied in the AP side of the candidate network, and either the AP directly or the terminal can, in such a case, report the reached availability level to the eNB for its control of further allowance.

In certain embodiments, there may be a tradeoff. Only a few link setup operations may reduce the power consumption if the link creation is unnecessary. On the other hand, many link setup operations/ready-made link can enable fast use of the link.

The link reporting level can prevent reactions to unavailable APs. The delay to set the link or the expected performance of the link may be estimated more precisely by the AP of the candidate network, therefore it is possible to quantify the goodness and expected performance of the candidate network(s) to the eNB for its decision to offload. Typically, this kind of performance assessment may be available from the beacon, by a request response protocol during the pre-associated state of the link or even more extensively in the associated state. Such performance assessment may contain extensive statistics of the candidate access network behavior from multiple stations collected as a function of time and traffic types over different day times and dates of network use. These statistics may be available by the Hotspot 2.0 protocol or any of its future extensions. It is noteworthy that proprietary means may allow such statistics with or without Hotspot 2.0 protocol in use. Such statistics, similar to other assessments of performance or goodness or convenience of use of a candidate network may in general apply as metric, provided for the decision of a secondary network selection.

The flexibility to configure different maturity levels for the link setup may direct the terminal to use the APs to which it may automatically create a link. Thus, the use of expensive APs may be avoided.

The eNB may coordinate the load of the network and select the AP among candidate APs. In this operation the eNB may consider both the load of the LTE/cellular base stations and the WLAN base stations. The eNB may select which radio to use for the data. Moreover, the eNB may consider the interference of the transmissions that will be caused to WLAN or LTE base stations. The eNB may consider all the traffic that the terminal is transmitting and select the RAT for the terminal. The interference issues can be solved or can disappear when a single radio is in use.

Figure 4:
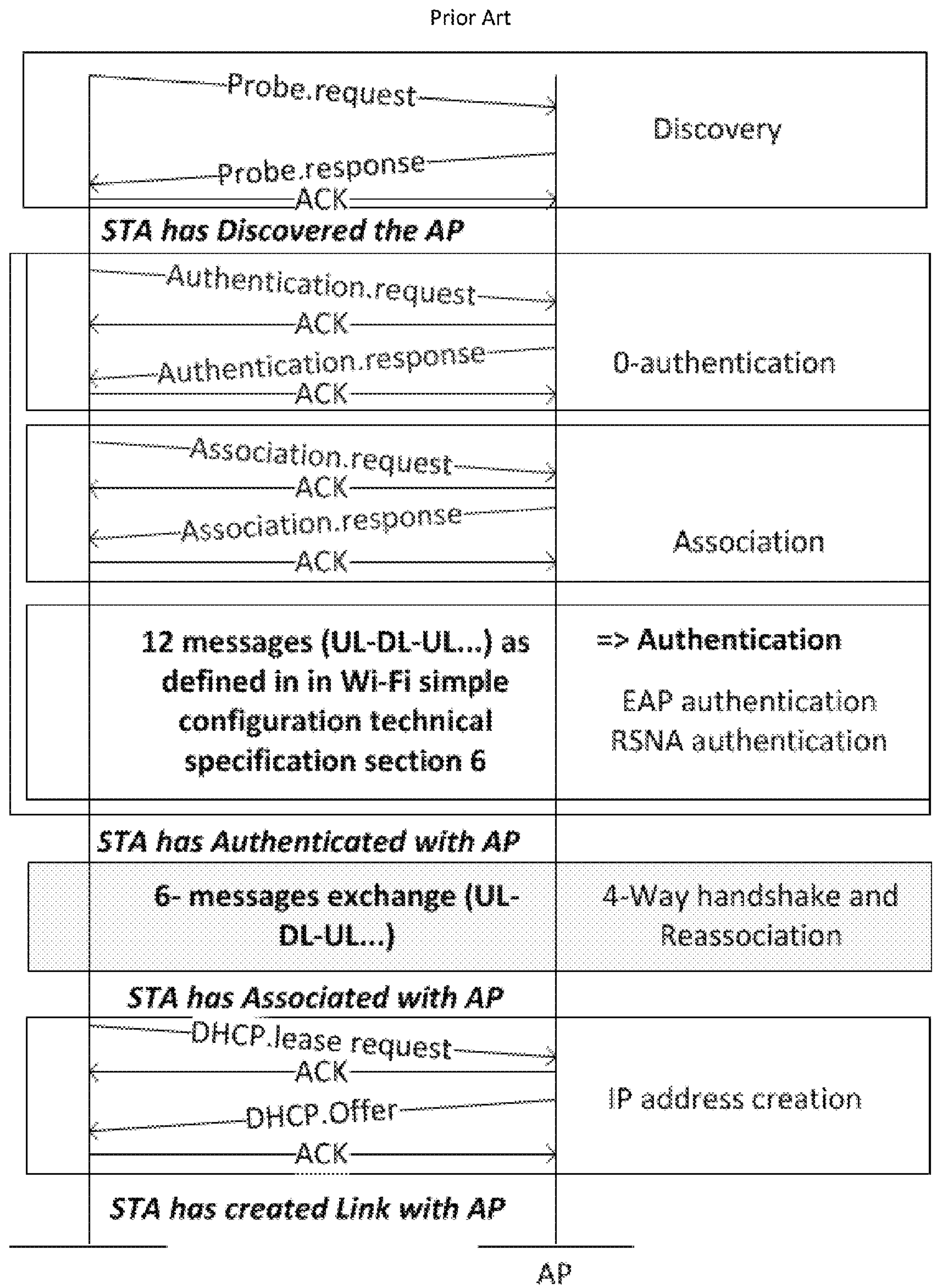
FIG. 4 illustrates example prior art link setup operations between a WLAN terminal and an AP.

FIG. 4 illustrates example link setup operations between a WLAN terminal and an AP. As shown in FIG. 4, during discovery operations a terminal or station (STA) can send a probe request to an access point (AP) and receive a probe response. The STA can acknowledge the probe response.

In 0-authentication, the STA can send an authentication request and receive an authentication response from the AP. In Association, the STA can send an association request and receive an association response from the AP. Each of these messages can be acknowledged.

In authentication, there can be, for example, 12 messages exchanged, as defined in Wi-Fi simply configuration technical specification, section 6. This authentication can include EAP authentication and RSNA authentication.

After the STA has authenticated with the AP, there can be a four-way handshake and reassociation. This phase can include, for example, six messages being exchanged. Once the STA has associated with the AP, there can be IP address creation phase, in which a DHCP lease request is sent to the AP and a DHCP offer is provided in response to the STA. Once this phase is complete, the STA can have created a link with the AP.

Figure 5:
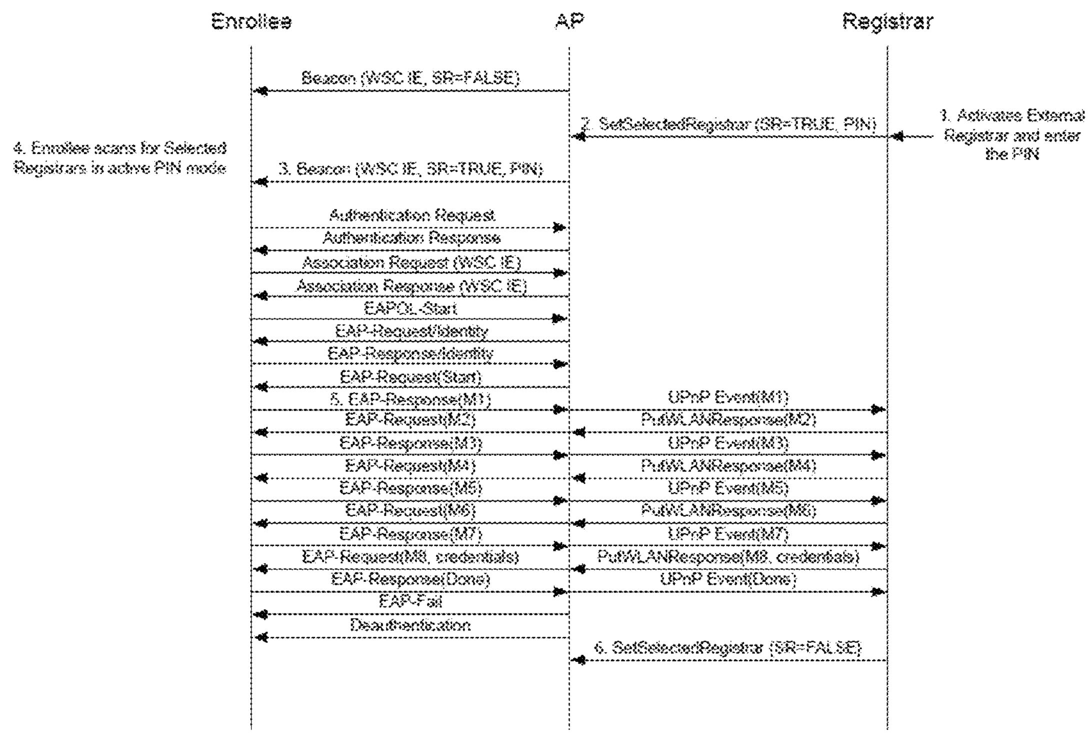
FIG. 5 illustrates an example prior art of RSNA authentication.

FIG. 5 illustrates an example of RSNA authentication. As shown in FIG. 5, an access point (AP) can provide a beacon. Once a registrar activates the AP, the AP can include a flag indicated that a selected registrar is available. An enrollee can see this flag, and authenticate and associate to the access point. The access point can verify the enrollee's credentials with the registrar can also deauthenticate the enrollee when necessary.

Figure 6:
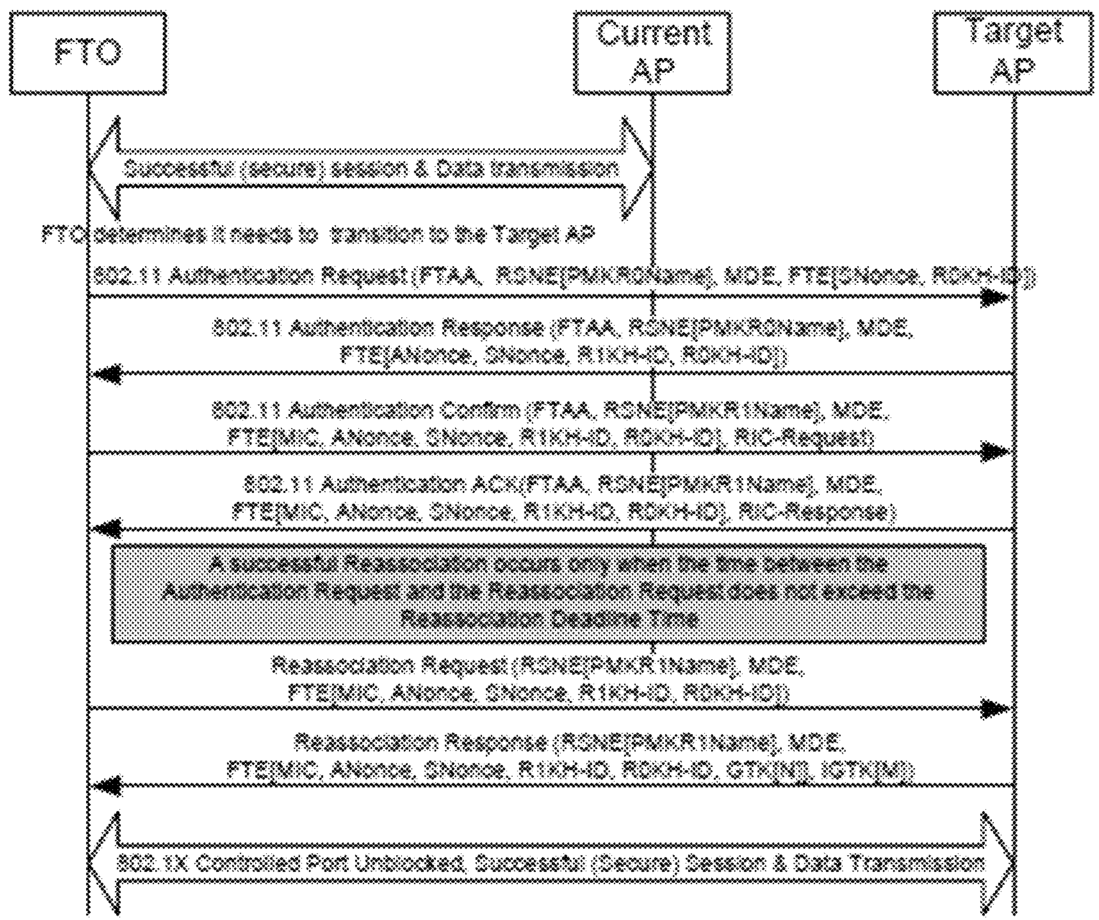
FIG. 6 illustrates an example prior art of reassociation signaling after RSNA authentication.

FIG. 6 illustrates an example of reassociation signaling after RSNA authentication. As shown in FIG. 6, a terminal (FTO) can have a successful secure session on-going with a current access point. The terminal can determine a need to transition to a target AP and can perform authentication with the target AP. Shortly after the authentication, the terminal can send a reassociation request and receive a reassociation response. The reassociation may be successful only when there is little elapsed time between the reassociation request and the authentication request. The time limit can be defined in terms of a reassociation deadline time.

Figure 7:
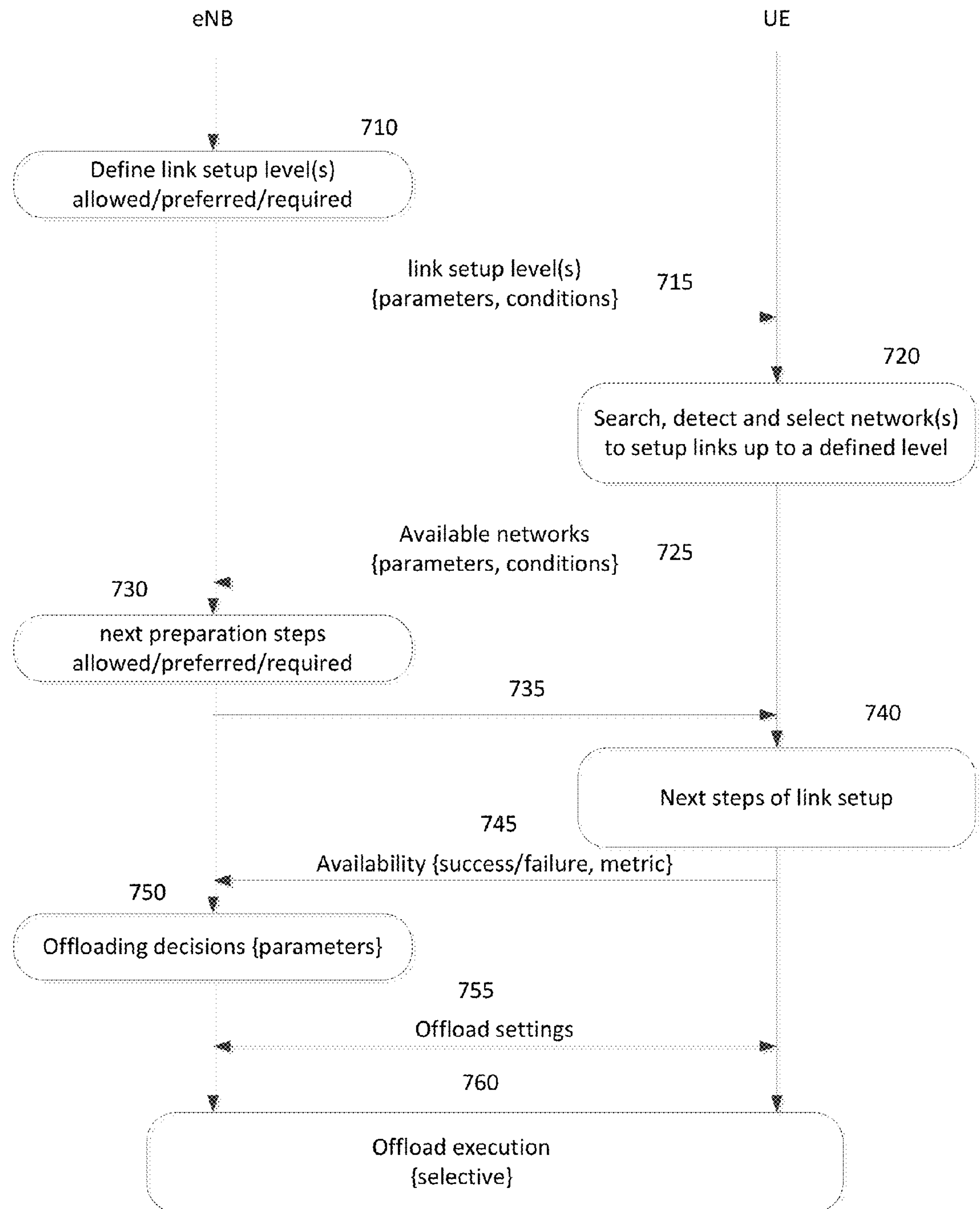
FIG. 7 illustrates a method according to certain embodiments.

FIG. 7 illustrates a method according to certain embodiments. As shown in FIG. 7, at 710 an eNB can define link setup level(s) allowed/preferred/required. Then, at 715, those link setup levels can be sent to the UE. The UE can, at 720, search, detect, and select network(s) to set up links up to a defined level. Then, at 725, the UE can report the available networks, together with parameters and conditions to the eNB.

At 730, the eNB can determine the next preparation steps that will be allowed/preferred/required. Then, at 735, the eNB can communicate those next preparation steps to the UE. At 740, the UE can take those next steps, and at 745 can report back the availability possibly with information such as success/failure and metric(s).

At 750, the eNB can make offloading decisions and determine associated parameters. Then, at 755 offload settings can be exchanged and at 760 offload execution can be made. Offload may be selective according to any of its defined criterion.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary

ANDSF Access Network Discovery and Selection Function

AP WLAN Access Point eNB evolved NodeB, LTE base station

HS2.0 Hotspot standard, v2.0

MO Management object; MO for ANDSF, for HS2.0 or for other device management method RAT Radio Access Technology, 3GPP RAT (may also include cdma2000)

STA Station, or generally a communication terminal, such as a user equipment

We claim:

1. A method, comprising:

receiving, at a terminal, a minimum link setup level and a maximum link setup level; and performing, by the terminal, link setup within a range defined by the minimum link setup level and the maximum link setup level, wherein the minimum link setup level defines one or more operations that the terminal needs to execute successfully before the terminal is allowed to report a network or a radio access technology as available to a base station that communicated the minimum link setup level and the maximum link setup level to the terminal, wherein the maximum link setup level defines one or more operations that the terminal is allowed to execute before reporting a network or a radio access technology as available to the base station, and wherein the minimum link setup level and the maximum link setup level are different.

2. The method of claim 1, further comprising:

sending, to the base station, a link setup level that the terminal has established with an access point on the terminal's own initiative.

3. The method of claim 1, further comprising:

reporting regarding availability of the network or the radio access technology when the terminal has executed each of the one or more operations as defined by the minimum link setup level.

4. An apparatus, comprising:

at least one processor; and at least one memory including computer program code, wherein the at least one memory and the computer program code are configured to, with the at least one processor, cause the apparatus at least to:

determine a minimum link setup level and a maximum link setup level for a terminal; and communicate the minimum link setup level and the maximum link setup level to the terminal, wherein the minimum link setup level defines one or more operations that the terminal needs to execute successfully before the terminal is allowed to report a network or a radio access technology as available to a base station that communicated the minimum link setup level and the maximum link setup level to the terminal, wherein the maximum link setup level defines one or more operations that the terminal is allowed to execute before reporting a network or a radio access technology as available to the base station, and wherein the minimum link setup level and the maximum link setup level are different.

5. The apparatus of claim 4, wherein the at least one memory and the computer program code are configured to, with the at least one processor cause the apparatus at least to set an expected link setup level that the terminal is expected to reach in order to report availability of a second network or a second radio access technology for further proceeding of the offload process by the base station.

6. The apparatus of claim 4, wherein the at least one memory and the computer program code are configured to, with the at least one processor, cause the apparatus at least to provide, by an access network discovery and selection function management object, radio interworking steps to a wireless local area network terminal connected with the minimum link setup level and the maximum link setup level.

7. The apparatus of claim 4, wherein the at least one memory and the computer program code are configured to, with the at least one processor, cause the apparatus at least to receive from the terminal a link setup level that the terminal has established with an access point on the terminal's own initiative.

8. The apparatus of claim 4, wherein the at least one memory and the computer program code are configured to, with the at least one processor, cause the apparatus at least to receive a report from the terminal regarding availability of the network or the radio access technology when the terminal has executed the one or more operations as defined by the minimum link setup level.

9. The apparatus of claim 4, wherein the base station is configured to command the terminal to use the network or the radio access technology without additional signaling of permission when the minimum link setup level is set to the highest data transmission level.

10. The apparatus of claim 4, wherein one of the minimum link setup level and the maximum link setup level are communicated as an indication of a difference between the minimum link setup level and the maximum link setup level.

11. An apparatus, comprising:

at least one processor; and at least one memory including computer program code, wherein the at least one memory and the computer program code are configured to, with the at least one processor, cause the apparatus at least to:

receive, at a terminal, a minimum link setup level and a maximum link setup level; and perform, by the terminal, link setup within a range defined by the minimum link setup level and the maximum link setup level, wherein the minimum link setup level defines tone or more operations that the terminal needs to execute successfully before the terminal is allowed to report a network or a radio access technology as available to a base station that communicated the minimum link setup level and the maximum link setup level to the terminal, wherein the maximum link setup level defines one or more operations that the terminal is allowed to execute before reporting a network or a radio access technology as available to the base station, and wherein the minimum link setup level and the maximum link setup level are different.

12. The apparatus of claim 11, wherein the at least one memory and the computer program code are configured to, with the at least one processor, cause the apparatus at least to send, to the base station, a link setup level that the terminal has established with an access point on the terminal's own initiative.

13. The apparatus of claim 11, wherein the at least one memory and the computer program code are configured to, with the at least one processor, cause the apparatus at least to report regarding availability of the network or the radio access technology when the terminal has executed the one or more operations as defined by the minimum link setup level.

14. The apparatus of claim 11, wherein the link setup is configured to provide data offloading of the terminal from a first radio access technology to a second radio access technology.

15. The method of claim 1, further comprising:

receiving a signal from the base station configured to allow additional operations of the terminal; and performing the additional operations upon receiving the signal.

16. The method of claim 1, wherein the link setup is configured to provide data offloading of the terminal from a first radio access technology to a second radio access technology.

17. The apparatus of claim 4, wherein the at least one memory and the computer program code are configured to, with the at least one processor, cause the apparatus at least to allow, by the base station, additional operations of the terminal by transmitting a signal to the terminal.

18. The apparatus of claim 4, wherein the at least one memory and the computer program code are configured to, with the at least one processor, cause the apparatus at least to coordinate, with the base station, operations of a wireless local area network terminal connected with the minimum link setup level and the maximum link setup level.

19. The apparatus of claim 11, wherein the at least one memory and the computer program code are configured to, with the at least one processor, cause the apparatus at least to:

receive a signal from the base station configured to allow additional operations of the terminal; and perform the additional operations upon receiving the signal.

20. The apparatus of claim 4, wherein the link setup is configured to provide data offloading of the terminal from a first radio access technology to a second radio access technology.

* * * * *